Sept. 19, 1944.  L. E. GODFRIAUX  2,358,503
TURRET INDEXING MECHANISM
Original Filed July 17, 1939   5 Sheets-Sheet 1

INVENTOR.
Louis Edward Godfriaux
BY
Fred G. Parsons
ATTORNEY.

Sept. 19, 1944.  L. E. GODFRIAUX  2,358,503
TURRET INDEXING MECHANISM
Original Filed July 17, 1939  5 Sheets-Sheet 2

INVENTOR.
Louis Edward Godfriaux
BY Fred G. Parsons
ATTORNEY.

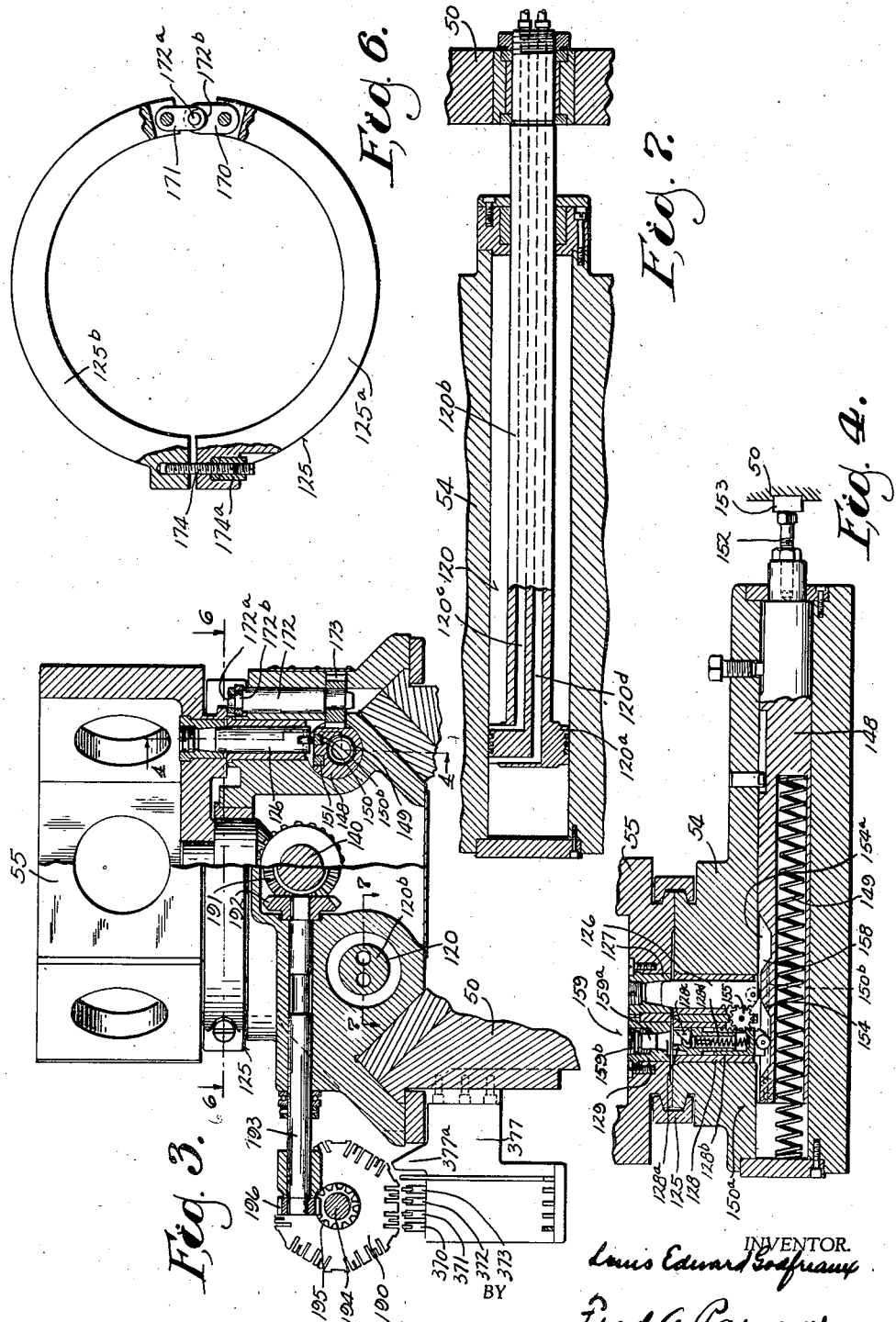

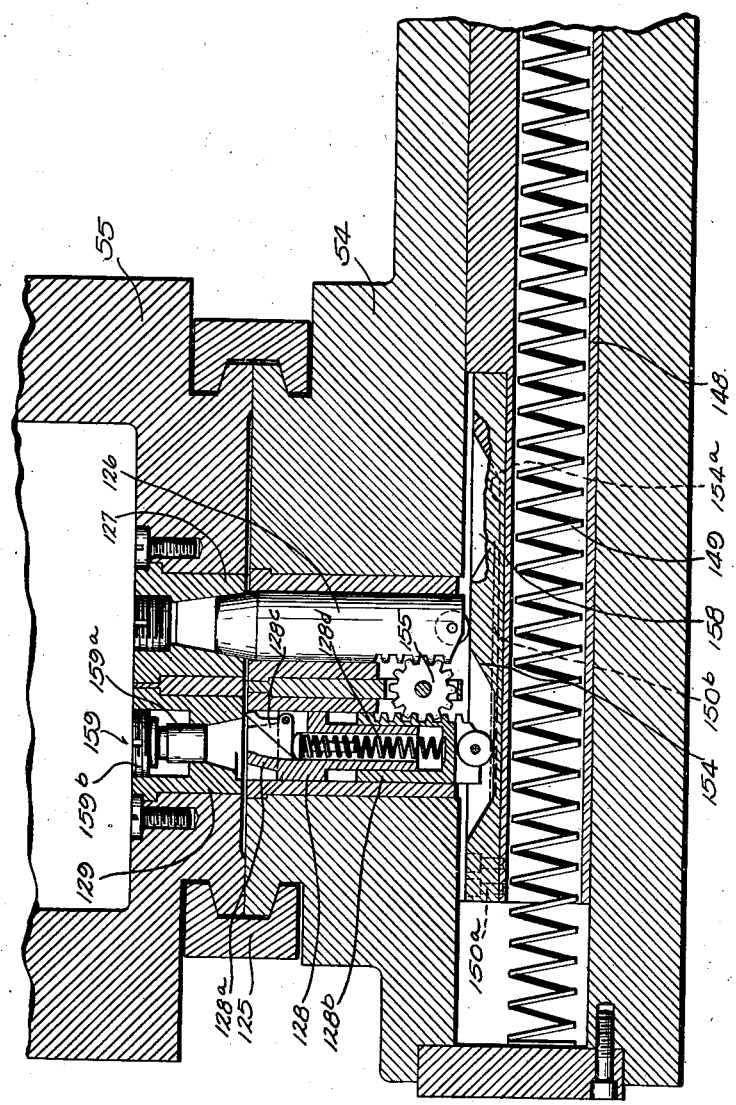

Sept. 19, 1944. L. E. GODFRIAUX 2,358,503
TURRET INDEXING MECHANISM
Original Filed July 17, 1939 5 Sheets-Sheet 5
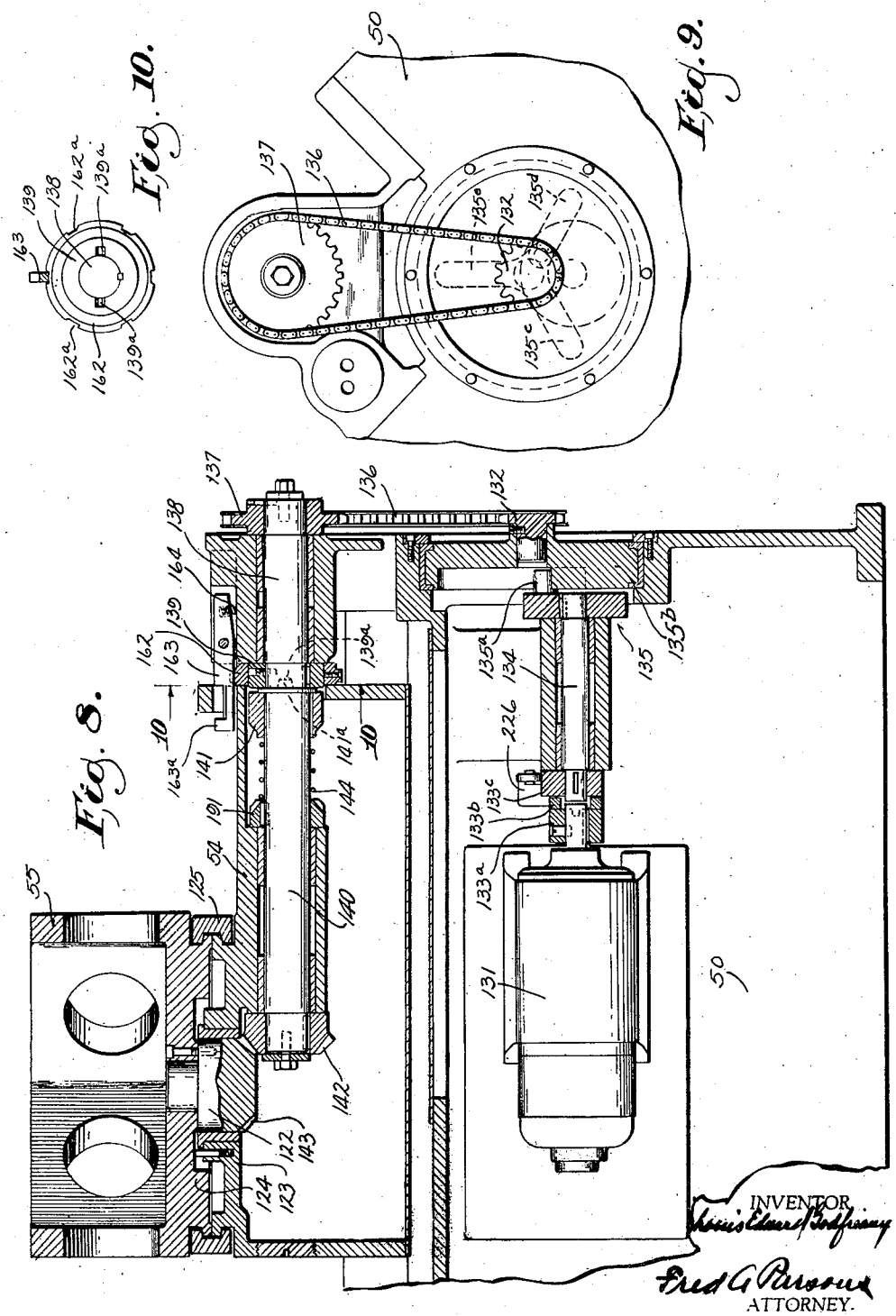

Patented Sept. 19, 1944

2,358,503

UNITED STATES PATENT OFFICE 2,358,503

TURRET INDEXING MECHANISM

Louis Edward Godfriaux, Madison, Wis., assignor to Gisholt Machine Company, Madison, Wis., a corporation of Wisconsin Original application July 17, 1939, Serial No. 284,905, now Patent No. 2,289,957, dated July 14, 1942. Divided and this application January 23, 1942, Serial No. 427,912

4 Claims. (Cl. 29—50)

This invention relates to turret indexing mechanism and more particularly for lathes, especially turret lathes.

This application is a division of a copending application Serial No. 284,905, filed July 17, 1939, now Patent 2,289,957, issued July 14, 1942.

The purpose of the invention is to effect an improved turret indexing mechanism adapted for automatic operation, in which all of the different working positions of the turret may be effected one after another if desired or some of them may be selectively passed over during the indexing, as predetermined by the adjustment of the mechanism.

A further purpose is to provide improved transmission mechanism for tool and work supporting units or supports of a machine tool, and in a form for improved cooperative relationship between different units.

A further purpose is to provide an improved control mechanism for the transmission mechanism of tool and work supports of a machine tool, and particularly to provide controls for the individual supports suited for cooperation and interconnection between the controls of different supports.

A further purpose is to provide transmission and control mechanism which incorporates fluid or hydraulic operated devices in an improved form and relationship.

A further purpose is to provide control mechanism in which both hydraulic and electric operated devices are incorporated, each for preferred individual purposes, and cooperatively interconnected for effecting combination control effects.

A further purpose is to provide an improved automatic control mechanism for machine operation, particularly where the machine cycle includes sub-cycles of operation of different units or supports, and particularly for turret lathes.

A further purpose is generally to simplify and improve the construction and operation of machine tools and of certain tool or work supporting elements thereof, especially for lathes and particularly for turret lathes.

Still other objects will be apparent from the specification, it being understood that the invention includes the methods and structures herein illustrated, described and claimed and such other methods and structure as are equivalent to the methods or structures of the claims.

The same reference characters have been used for the same parts throughout, and in the drawings:

Figure 3 is a partial vertical section, taken approximately along line 3—3 of Fig. 2.

Figure 4 is a partial vertical section taken approximately along line 4—4 of Fig. 3.

Figure 5 is an enlargement of a portion of Fig. 4.

Figure 6 is a plan view of a clamp ring structure shown in Fig. 3, partly in horizontal section along line 6—6 of Fig. 3.

Figure 7 is a partial horizontal section along line 7—7 of Fig. 3.

Figure 8 is a partial vertical section along line 8—8 of Fig. 2.

Figure 9 is a partial right end elevation of the mechanism of Fig. 8.

Figure 10 is a partial vertical section along line 10—10 of Fig. 8.

Figure 1:
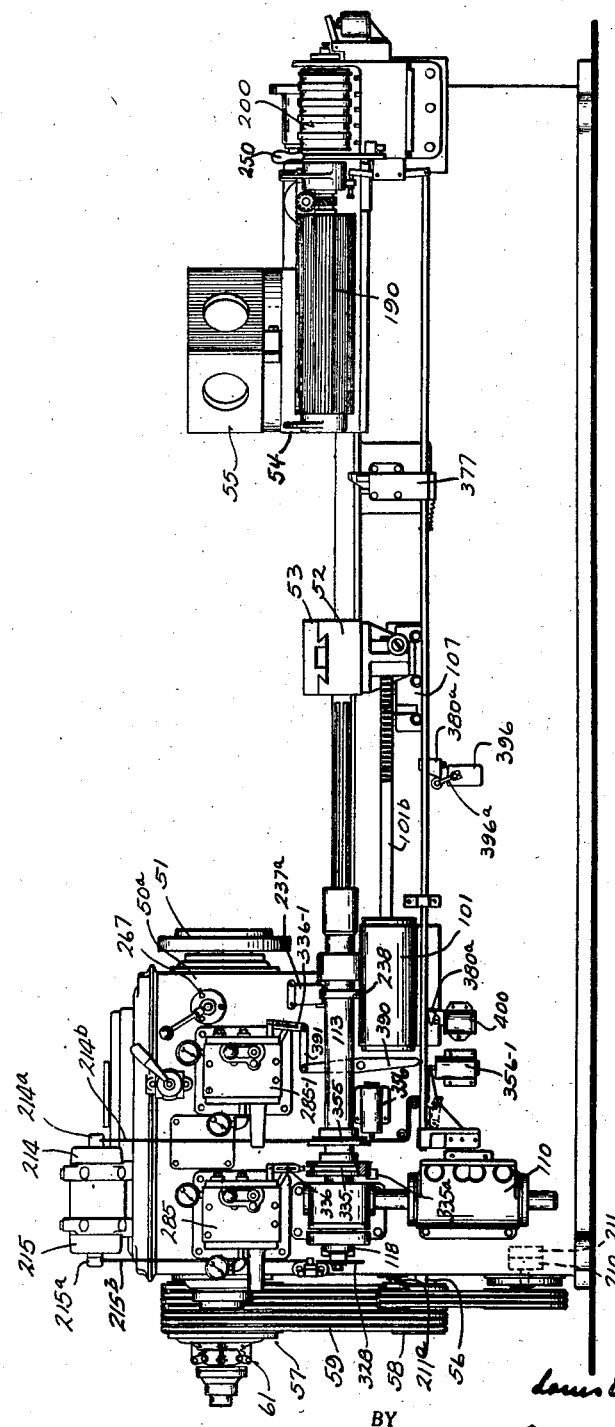
Figure 1 is a front elevation of an automatic turret lathe incorporating the invention.

The lathe of Fig. 1 includes a bed or main support 50 having an upstanding headstock portion 50a in which an axially horizontal spindle 51 is rotatably journaled. Slidably guided on suitable ways on bed 50 for longitudinal movement parallel with the spindle axis there is tool carriage 52 which supports a cross slide 53 bodily movable with the carriage and slidably guided thereon for movement transverse to the carriage movement. Also longitudinally slidably guided on bed 50 there is a turret carriage 54 which supports a tool turret 55 for bodily movement with the carriage and index movement about a vertical axis.

The turret carriage 54, Fig. 1, is there shown in a loading position, at the extreme of its right-hand movement. From this position the carriage has forward movement to the left, the first portion of such forward movement being at relatively fast quick traverse rate, which is changed to a feed rate as cutting tools, not shown, which are suitably fixed with the turret face then presented to the work, are about to contact the work piece. At the completion of the forward stroke the turret is returned to the loading position at relatively rapid rate. These movements are effected by a piston device 120, Figs. 3, 7, having a piston 120a, a piston rod 120b, and ports 120c, 120d, the piston rod being rigidly fixed with a bracket 121 fixed on bed 50, the piston operating in a suitable bore in the carriage 54 which forms a cylinder fixed with the carriage and bodily movable therewith. The feed and quick traverse movements of the turret carriage 54, and the control mechanism therefor have been fully described in said Patent No. 2,289,957 and therefore need not here be described.

The turret 55, Figs. 1, 3, is rotatably positioned on the turret carriage 54 by the means of a pivot shaft 122, Fig. 8, which is fixed with the turret and journaled in a top plate 123 of the carriage, the turret providing a bottom plate 124 bearing against the carriage top plate. The adjacent edges of the plates are annular and provide angular surfaces upon which portions 125a, 125b of a clamp ring 125, Fig. 6, may be contracted whereby to rigidly clamp the turret in any of its indexed positions, as later explained. A primary locating plunger 126, Fig. 5, is engageable with primary locating bushings such as 127 in each of the turret index positions, there being also another locating plunger 128 providing an upper portion 128a engageable with bushings such as 129 in each of the turret positions, the plunger 128 also providing a lower portion 128b and a pivoted trigger device 128c urged by a spring 128b, for purposes later explained.

When the turret locating plungers 126, 128, Fig. 5, are withdrawn below their respective bushings and the clamp ring 125 is released the turret 55 may be rotatably power indexed, but only when the turret carriage 54 is in the right-hand limit of its movement, Figs. 1, 2. The power indexing mechanism is as follows:

A motor 131, Fig. 8, is housed in the hollow bed 50 underneath the turret carriage, and when energized the motor drives a sprocket 132 through coupling members 133a, 133b, 133c, a shaft 134 and a crank pin 135a of a Geneva motion device 135, Figs. 8, 9, the Geneva device including a rotatably mounted cam plate 135b providing three equi-angular cam slots 135c, 135d, 135e; the sprocket 132 being fixed for rotation with the cam plate 135b; whereby actuation of shaft 134 at constant speed effects a step-by-step angular movement of 120° of sprocket 132. The sprocket 132 is connected for rotatably indexing the turret 55 through a chain 136, another sprocket 137, a shaft 138, a coupling member 139 having notch portions 139a, and fixed on shaft 138, a coupling member 141 slidably keyed on a shaft 140 and having tooth portions such as 141a adapted to engage the notches 139a, and a pair of meshed bevel gears 142, 143 respectively fixed on the shaft 140 and on the pivot shaft 122.

The ratio of the described train connecting the sprocket 132 and turret 55 is such that the 120° angular movement of the sprocket 132 is reduced to 60° of angular turret movement. The drive from motor 131 to and including the coupling member 139 is carried on bed 50, while the coupling member 141 and the remainder of the train is carried on the turret carriage. As the turret carriage reaches the limit of its right-hand movement the coupling teeth 141a engage the notches 139a and the motor 131 may then index the turret. A spring 144 provides a yielding of the coupling member 141 sufficient to firmly seat the teeth 141a in the notches, the teeth and notches having complementary angular sides for such seating to prevent lost motion in the index train.

For withdrawing the turret index locating plungers 126, 128, Fig. 5, whereby to permit indexing of the turret, and for later reengaging the locating plungers there is mechanism as follows:

A control plunger 148, Figs. 3, 4, 5, is slidably fitted in a suitable longitudinal bore in the turret carriage 54 and yieldably urged to the right in Fig. 4 by a spring 149. The control plunger 148 carries configurated cam insets 150, 151, Fig. 3, respectively for the index locating plungers 126, 128, each of the plungers having suitable cam follower rolls at their lower ends, as shown in Fig. 4. During backward movement of the turret carriage, to the right in Fig. 4, an adjustable abutment screw 152 contacts an abutment 153 fixed on bed 50 and plunger 148 is forced to the left in Fig. 4. During this movement the lower portion 128b of plunger 128 is forced upwardly by a cam surface 154 of its cam insert 151 and thereby simultaneously forces the plunger 126 downwardly out of engagement with its bushing, the lower plunger end being received in a cam depression 154a, there being for such simultaneous plunger movement a pinion 155 simultaneously oppositely engaging suitable rack teeth on the different plungers. Both the plungers are then disengaged since the abutment of latch 128c on the bottom of its bushing prevents the upper portion 128a of plunger 128 from entering the bushing at this time. The turret carriage 54 reaches the limits of its backward movement, where the coupling members 139, 141, Fig. 8, are engaged for indexing, as previously described, while both the plungers 126, 128 are disengaged, and the indexing then is initiated as later described. During the index movement the next bushing to be engaged by plunger 128 passes through a position where the latch 128c permits entry of the plunger 128 which then engages its bushing for locating the turret substantially in indexed position. During the next forward movement of the turret carriage, to the left of the position shown in Fig. 4, the spring 154 forces the plunger 148 back toward the relative position shown in Fig. 4, whereby the locating plunger 126 is forced upwardly into engagement with its 126 bushing by a cam portion 158, the pinion 155 simultaneously forcing the lower plunger portion 128b downwardly into a suitable cam depression and this movement also carrying the upper plunger portion 128a downwardly sufficiently for the latch 128c to again engage under the lower face of its bushing, as before. The upper portion 128a of plunger 128 is normally sufficiently loosely fitted in its bore that it will follow downwardly when the lower portion 128b is forced downwardly as described. However, suitable pin and slot lost motion connections may be used for interconnecting the portions 128a, 128b to insure that the portion 128a is forced downwardly with portion 128b while permitting relative movement of the portion 128b upwardly for compressing spring 128d while the latch 128c prevents movement of the portion 128a upwardly as described. Such lost motion means is contemplated but since such expedients are well understood in the art in various forms the pin and slot connection is not shown.

It will be noted that the final seating of the primary turret locating plunger 126, Figs. 3, 4, is spring pressed to insure full engagement, the cam inset 150 which effects such seating being a cantilever spring fixed with plunger 148 at the one end by screws such as 150a, Fig. 4, and having clearance at 150b, Figs. 3, 5.

If it is desired, during indexing, to pass over one or more turret positions the plunger 128, Fig. 5, is prevented from entering the locating bushings at the corresponding station or stations. This is effected by blocking plugs, such as 159, which are associated with each of the various bushings for plunger 128. The blocking plugs have a lower abutment portion 159a which is normally retained in upper position, as shown, by a threaded portion 159b engaging a suitable threaded bore, but the abutment plug may be advanced by the threads of the bore to stand in a lower position preventing entry of plunger 128 into the bushing. The control mechanism for effecting the multiple index movements required for passing over desired index stations will be later described.

Means are provided to prevent the turret carriage 54 from moving forward, to the left in Figs. 1, 8, unless the indexing of turret 55 has been properly completed. To effect this result a ring 162, Figs. 8, 10, is fixed on the coupling member 139 for rotation with the index train shaft 138, the ring having notches such as 162a at suitable angular spacing to receive a lever 163, pivoted on the bed 50, when the index train is in any of the indexed turret positions, the lever being urged to such engagement by a spring 164. When the lever is engaged in a notch 162a the turret carriage may move forward but if the turret is not properly indexed, whereby the lever is not engaged, an interference portion 163a will be engaged by an abutment portion 165 fixed on the carriage to prevent forward carriage movement.

The plunger 148, Fig. 4, is also used for unclamping the turret clamp ring 125, Figs. 3, 6, prior to indexing, and for subsequently reclamping the turret. The ring portions 125a, 125b are provided with toggle links 170, 171 each pivoted at the one end on the corresponding ring portion and at the other end respectively on different eccentric portions 172a, 172b on a shaft 172 which also has fixed thereon a gear 173 engaging suitable rack teeth on the plunger 148. The angular position of the eccentrics and relationship of the parts is such that as the plunger 148 is shifted to the left, Fig. 4, at the end of the right-hand carriage movement as described, the eccentrics spread the clamp ring portions to unclamp the turret for the index movement, and when the spring 149 forces the plunger in the other direction at the start of the next forward carriage movement, the eccentrics draw the clamp ring members together to clamp the turret, but not until the index locating plunger 126 has seated to locate the turret, as previously described. For adjusting the clamp ring there is provided a stud 174 fixed on the one ring portion and in threaded engagement with a nut 174a carried by the other ring portion.

Figure 2:
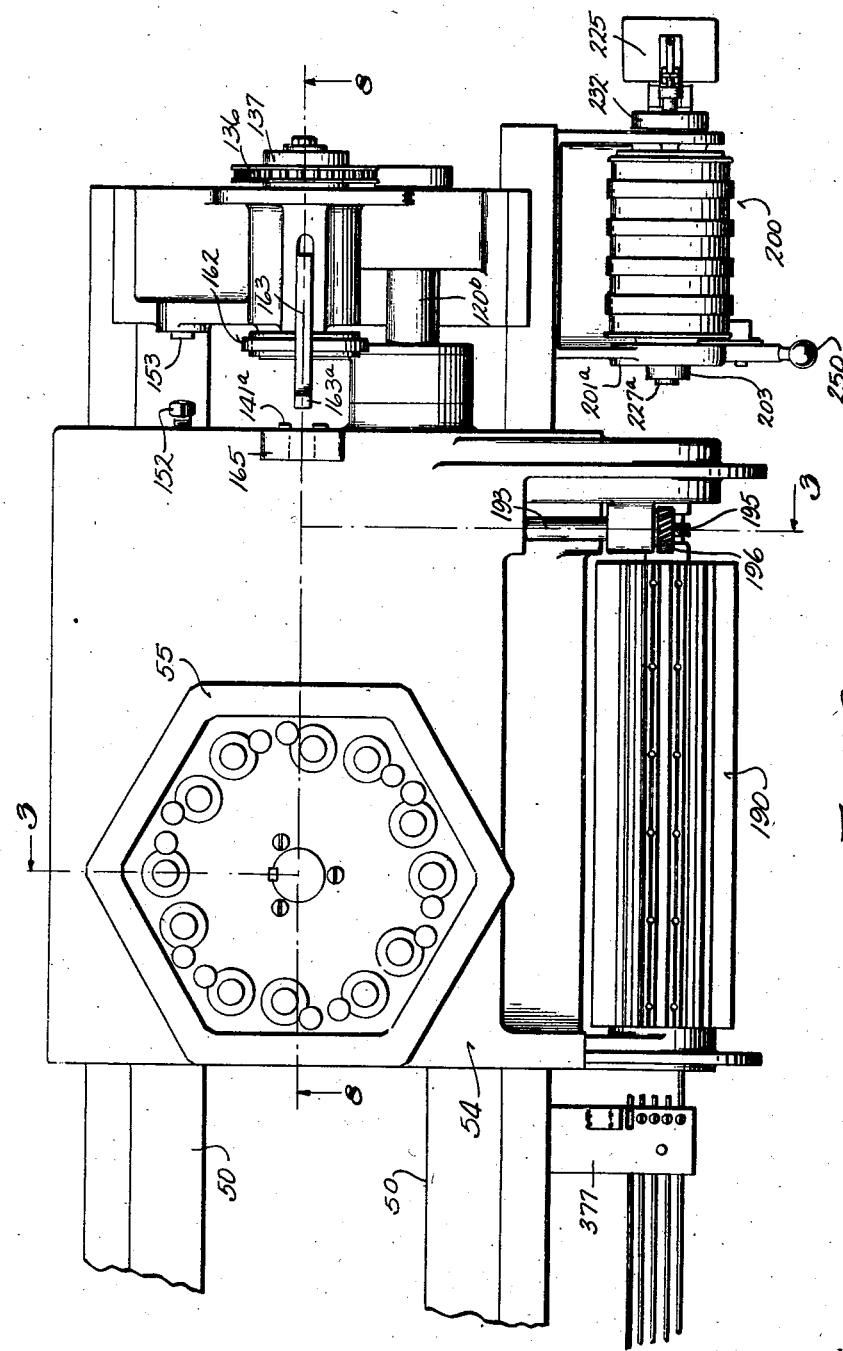
Figure 2 is an enlarged plan view of a turret and its carriage, together with some of the control mechanism shown at the right end of the machine of Fig. 1.

An indexible control dog drum 190, Figs. 1, 2, 3, is rotatably carried on the turret carriage 54 for bodily longitudinal movement therewith. Referring to Figs. 3, 8, the index train shaft 140 has fixed thereon a bevel gear 191 meshed with a bevel gear 192 fixed on a shaft 193 which is connected to a control drum shaft 194 through meshed helical gears 195, 196; whereby the control drum 190 is indexed correspondingly with turret 55. Suitable dog sets on drum 190, respectively operative in the different index positions of the drum may operate during the longitudinal movement of the turret carriage for selectively determining various machine functions to suit the operating position of the turret.

An indexible control dog drum 200, Figs. 1, 2, is rotatably carried on suitable bracket portions 201a, 201b on bed 50. Drum 200 is fixed on a shaft 202 and when the turret carriage is in its turret index position, that is to say, at the extreme right, Fig. 1, suitable notches of a coupling member 203 fixed on the drum shaft are engaged by complementary tooth members on a suitable coupling member fixed on the shaft of drum 190. The tooth members have lost motion in the notches, for reasons later explained. When the turret 55 and control dog drum 190 are indexed as previously described the control dog drum 200 is correspondingly indexed through the engaged coupling members. Suitable dog sets on drum 200, respectively for the different index steps of the turret 55, may operate during the index movement to select various other machine functions according to the operating position of the turret after the indexing.

The functions controlled by the dog drums 190, 200 and the manner of such control for the machine of Fig. 1, together with the method of initiating an indexing operation of the motor 131 at predetermined times in a cycle of machine operations is fully disclosed in said issued patent.

It will be understood that a cycle of machine operation includes the step-by-step indexing of the turret 55 through one revolution, whereby the dog drums 190 and 200 are each also indexed through one revolution, but if the nature of the work piece does not require as many turret tool sets as there are tool faces provided on the turret some of the index movements of the turret and dog drums may cause these parts to pass over some of the index positions. The indexing is effected while the turret carriage 54 is on its extreme right position, shown in Fig. 1, and between each successive operation of the turret index mechanism the carriage is caused to effect a forward movement, to the left of the position shown in Fig. 1 and a return to the position of Fig. 1.

What is claimed is:

1. In a machine tool the combination of a rotatably indexible turret, a turret support, a main index plunger and a supplemental index plunger each carried by said support, said turret providing a plurality of sets of sockets respectively for the different plungers and each including a plurality of spaced sockets respectively for receiving the corresponding plunger in the different index positions of the turret, means for operating said plungers including means for the socket engagement of the main plunger to disengage the supplemental plunger and vice versa and including means releasably restraining said supplemental plunger from engagement when the main plunger is disengaged for a turret index movement, means operable to render said restraining means ineffective during said index movement whereby to effect engagement of the supplemental plunger with the next socket reached during the index movement, and means subsequently operable to engage the main plunger in its corresponding socket.

2. In a machine tool the combination of a rotatably indexible turret, a turret support, a main index plunger and a supplemental index plunger each carried by said support, said turret providing a plurality of sets of sockets respectively for the different plungers and each including a plurality of spaced sockets respectively for receiving the corresponding plunger in the different index positions of the turret, means for operating said plungers including means for the socket engagement of the main plunger to disengage the supplemental plunger and vice versa and including means releasably restraining said supplemental plunger from engagement when the main plunger is disengaged for a turret index movement, means operable to render said restraining means ineffective during said index movement whereby normally to effect engagement of the supplemental plunger with the next socket reached during the index movement, means adjustable to selectively prevent the last mentioned engagement of said supplemental index plunger with some of its sockets whereby to pass over the corresponding index positions, and means operable to engage said main index plunger in its corresponding socket subsequent to the next engagement of said supplemental index plunger permitted by said adjustable means.

3. In a machine tool the combination of a rotatably indexible turret, a turret support, a main index plunger and a supplemental index plunger each carried by said support, said turret providing a plurality of sets of sockets respectively for the different plungers and each including a plurality of spaced sockets respectively for receiving the corresponding plunger in the different index positions of the turret, means for operating said plungers including means for the socket engagement of the main plunger to disengage the supplemental plunger and vice versa and including means releasably restraining said supplemental plunger from engagement when the main plunger is disengaged for a turret index movement, means operable to render said restraining means ineffective during said index movement whereby to effect engagement of said supplemental plunger with the next socket reached during said index movement, a power operable transmission for said index movement, means operable for said disengagement of the main index plunger and connecting said transmission for power operation thereof whereby to initiate said index movement, and means subsequently operable to engage said main index plunger in its socket corresponding to the socket engaged by said supplemental index plunger during said index movement.

4. In a machine tool the combination of a rotatably indexible turret, a turret support, a main index plunger and a supplemental index plunger each carried by said support, said turret providing a plurality of sets of sockets respectively for the different plungers and each including a plurality of spaced sockets respectively for receiving the corresponding plunger in the different index positions of the turret, means for operating said plungers including means for the socket engagement of the main plunger to disengage the supplemental plunger and vice versa and including means releasably restraining said supplemental plunger from engagement when the main plunger is disengaged for a turret index movement, means operable to render said restraining means ineffective during said index movement, whereby normally to effect engagement of the supplemental plunger with the next socket reached during the index movement, means adjustable to selectively prevent the last mentioned engagement of said supplemental index plunger with some of its sockets whereby to pass over the corresponding index positions, a power operable transmission for said index movement, means operable for said disengagement of the main index plunger and connecting said transmission for power operation thereof whereby to initiate said index movement, and means subsequently controlling the power connection of said transmission to effect interruption thereof only in such turret index positions where said adjustable means permits said supplemental index plunger to engage its socket.

LOUIS EDWARD GODFRIAUX.